(12) United States Patent
Rihn (10) Patent No.: US 10,551,981 B2
(45) Date of Patent: Feb. 4, 2020

(54) SYSTEMS AND METHODS FOR DISTRIBUTING HAPTIC EFFECTS TO USERS INTERACTING WITH USER INTERFACES

(71) Applicant: Immersion Corporation, San Jose, CA (US)

(72) Inventor: William S. Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/904,206

(22) Filed: Feb. 23, 2018

(65) Prior Publication Data
US 2018/0181235 A1   Jun. 28, 2018

Related U.S. Application Data

(63) Continuation of application No. 14/713,166, filed on May 15, 2015, now abandoned.

(51) Int. Cl.
*G06F 3/044* (2006.01)
*G06F 3/01* (2006.01)

(52) U.S. Cl.
CPC .............. *G06F 3/044* (2013.01); *G06F 3/011* (2013.01); *G06F 3/016* (2013.01); *G06F 3/017* (2013.01); *B60K 2370/00* (2019.05)

(58) Field of Classification Search
CPC .......... G06F 3/044; G06F 3/016; G06F 3/017; G06F 3/011; B60K 37/06; B60K 35/00; B60K 2350/1052; B60K 2350/00
See application file for complete search history.

(56) References Cited

U.S. PATENT DOCUMENTS

2004/0117084 A1   7/2004  Mercier et al.
2006/0146036 A1*  7/2006  Prados ............... G06F 3/016
                                                   345/173
(Continued)

FOREIGN PATENT DOCUMENTS

EP   2138928 A2   12/2009
GB   2445445 A     7/2008
(Continued)

OTHER PUBLICATIONS

Communication pursuant to Article 94(3) EPC dated Oct. 19, 2018 in European Patent Application No. 12 154 829.1.
(Continued)

*Primary Examiner* — Premal R Patel
(74) *Attorney, Agent, or Firm* — Medler Ferro Woodhouse & Mills PLLC (57) ABSTRACT

A system includes a user interface configured to receive an input from a user of the system, a sensor configured to sense a position of a user input element relative to the user interface, and a processor configured to receive an input signal from the sensor based on the position of the user input element relative to the user interface, determine a haptic effect based on the input signal, and output a haptic effect generation signal based on the determined haptic effect. A haptic output device is configured to receive the haptic effect generation signal from the processor and generate the determined haptic effect to the user, the haptic output device being located separate from the user interface so that the determined haptic effect is generated away from the user interface.

20 Claims, 6 Drawing Sheets

(56) References Cited

U.S. PATENT DOCUMENTS

| | | |
|---|---|---|
| 2007/0097091 A1 | 5/2007 | Ng et al. |
| 2007/0257821 A1 | 11/2007 | Son et al. |
| 2008/0122799 A1 | 5/2008 | Pryor |
| 2009/0244017 A1 | 10/2009 | Pala et al. |
| 2009/0325647 A1 | 12/2009 | Cho et al. |
| 2010/0267424 A1 | 10/2010 | Kim et al. |
| 2012/0019373 A1 | 1/2012 | Kruse et al. |
| 2013/0050131 A1 | 2/2013 | Lee et al. |
| 2013/0191741 A1 | 7/2013 | Dickinson et al. |
| 2013/0321317 A1 | 12/2013 | Hirukawa |
| 2013/0342366 A1* | 12/2013 | Kiefer .................. G08B 6/00 340/901 |
| 2014/0035736 A1 | 2/2014 | Weddle et al. |
| 2014/0098043 A1 | 4/2014 | Grant |
| 2014/0167942 A1 | 6/2014 | Kyllonen et al. |
| 2014/0331185 A1* | 11/2014 | Carls .................. B60K 37/06 715/835 |
| 2014/0333564 A1* | 11/2014 | Hong .................. G06F 3/016 345/173 |
| 2015/0022328 A1 | 1/2015 | Choudhury |
| 2015/0040005 A1* | 2/2015 | Faaborg .............. H04M 19/047 715/702 |
| 2015/0307022 A1* | 10/2015 | Nelson .................. B62D 1/046 701/36 |
| 2015/0331572 A1 | 11/2015 | Mischke et al. |
| 2016/0170504 A1* | 6/2016 | Varlamov .............. G06F 3/016 345/179 |
| 2016/0334901 A1 | 11/2016 | Rihn et al. |

FOREIGN PATENT DOCUMENTS

| | | |
|---|---|---|
| WO | 2009/118272 A1 | 10/2009 |
| WO | 2014092512 A1 | 6/2014 |

OTHER PUBLICATIONS

Extended European Search Report, EP Application No. 16166421.4, dated Sep. 14, 2016.

* cited by examiner

SYSTEMS AND METHODS FOR DISTRIBUTING HAPTIC EFFECTS TO USERS INTERACTING WITH USER INTERFACES

CROSS-REFERENCE TO RELATED APPLICATION

The present application is a continuation of U.S. patent application Ser. No. 14/713,166, filed May 15, 2015, the disclosure of which is incorporated by reference herein in its entirety.

FIELD

The present invention is generally related to systems and methods for distributing haptic effects to users interacting with user interfaces.

BACKGROUND

Many user interfaces, such as automotive user interfaces located in center consoles of automobiles, are designed such that multiple interactions are needed to activate a specific function, such as pressing an air conditioning button before adjusting the temperature. One challenge with such interactions is that the user may not have a way to identify where buttons exist on a touch screen of the user interface without looking at the touch screen. Although haptic effects may be generated at the user interface to assist the user with identifying where the buttons are located without having to look at the touch screen, the user would need to stay in contact with the touch screen for a period of time so that the haptic effects can be generated and disseminated by the user.

SUMMARY

It is desirable to provide haptic effects to locations where the user will normally be in constant contact so that the user does not have to be distracted by having to keep in contact with the user interface in order to receive information from the user interface.

According to an aspect of the invention, a system is provided and includes a user interface configured to receive an input from a user of the system, a sensor configured to sense a position of a user input element relative to the user interface, and a processor configured to receive an input signal from the sensor based on the position of the user input element relative to the user interface, determine a haptic effect based on the input signal, and output a haptic effect generation signal based on the determined haptic effect. The system also includes a haptic output device configured to receive the haptic effect generation signal from the processor and generate the determined haptic effect to the user, the haptic output device being located separate from the user interface so that the determined haptic effect is generated away from the user interface.

In an embodiment, the system also includes a wearable device configured to be worn by the user, and the wearable device includes the haptic output device.

In an embodiment, the wearable device is a smartwatch. In an embodiment, the wearable device is a fitness band.

In an embodiment, the system also includes a handheld electronic device configured to be carried by the user, and the handheld electronic device includes the haptic output device.

In an embodiment, the handheld electronic device is a smartphone.

In an embodiment, the user interface includes a second haptic output device, and the second haptic output device is configured to generate a second haptic effect to the user at the user interface as a confirmation of the input from the user.

In an embodiment, the haptic output device is configured to generate a third haptic effect to the user at a location away from the user interface. In an embodiment, the second haptic effect and the third haptic effect are the same haptic effect.

In an embodiment, the system also includes a handheld electronic device configured to be carried by the user, and the handheld electronic device includes the user interface.

According to an aspect of the invention, a method is provided for generating a haptic effect to a user of a system. The method includes sensing, with a sensor, a user input element located near a user interface configured to receive an input from the user, determining, with a processor, a haptic effect to generate to the user based on the sensing, outputting, with the processor, a haptic effect generation signal based on the determined haptic effect to a haptic output device, and generating the determined haptic effect, with the haptic output device, at a location away from the user interface.

In an embodiment, the method also includes sensing, with a second sensor, an input by the user via the user input element contacting the user interface, determining, with the processor, a second haptic effect to generate to the user based on the input sensed, and generating the second haptic effect, with a second haptic output device, to the user at the user interface as a confirmation of the input from the user.

In an embodiment, the second haptic effect is generated as long as the user input element contacts the user interface.

In an embodiment, the method also includes determining, with the processor, a third haptic effect to generate to the user based on the input sensed, and generating the third haptic effect, with the haptic output device, to the user at the location away from the user interface. In an embodiment, the second haptic effect and the third haptic effect are the same haptic effect.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
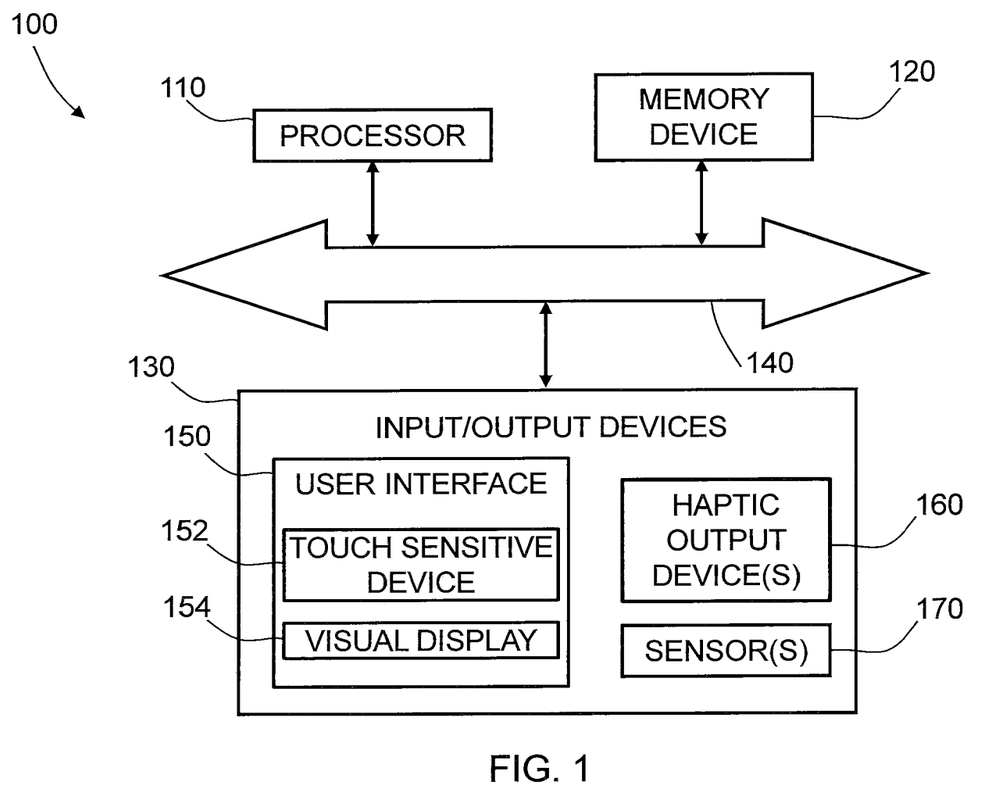
FIG. 1 is a schematic illustration of a system in accordance with embodiments of the invention.

FIG. 1 is a schematic illustration of a system 100 in accordance with embodiments of the invention. The system 100 may be part of or include one or more of an electronic device (such as a desktop computer, laptop computer, electronic workbook, point-of-sale device, game controller, etc.), an electronic handheld device (such as a mobile phone, smartphone, tablet, tablet gaming device, personal digital assistant ("PDA"), portable e-mail device, portable Internet access device, calculator, etc.), a wearable device (such as a smartwatch, fitness band, glasses, head-mounted display, clothing, such as smart socks, smart shoes, etc.) or other electronic device. In some embodiments, the system 100 or a part of the system 100 may be integrated into a larger apparatus, such as a vehicle, as described in implementations of the system 100 below.

As illustrated, the system 100 includes a processor 110, a memory device 120, and input/output devices 130, which may be interconnected via a bus and/or communications network 140. In an embodiment, the input/output devices 130 may include a user interface 150, at least one haptic output device 160, at least one sensor 170, and/or other input/output devices.

The processor 110 may be a general-purpose or specific-purpose processor or microcontroller for managing or controlling the operations and functions of the system 100. For example, the processor 110 may be specifically designed as an application-specific integrated circuit ("ASIC") to control output signals to a user of the input/output devices 130 to provide haptic feedback or effects. The processor 110 may be configured to decide, based on predefined factors, what haptic feedback or effects are to be generated based on a haptic signal received or determined by the processor 110, the order in which the haptic effects are generated, and the magnitude, frequency, duration, and/or other parameters of the haptic effects. The processor 110 may also be configured to provide streaming commands that can be used to drive the haptic output device 160 for providing a particular haptic effect. In some embodiments, more than one processor 110 may be included in the system 100, with each processor 110 configured to perform certain functions within the system 100. An embodiment of the processor 110 is described in further detail below.

The memory device 120 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 160 of the input/output devices 130 are to be driven, and/or other information for generating haptic feedback or effects.

The bus and/or communications network 140 may be configured to allow signal communication between the various components of the system 100 and also to access information from remote computers or servers through another communications network. The communications network may include one or more of a wireless communications network, an Internet, a personal area network ("PAN"), a local area network ("LAN"), a metropolitan area network ("MAN"), a wide area network ("WAN"), etc. The communications network may include local radio frequencies, cellular (GPRS, CDMA, GSM, CDPD, 2.5G, 3G, 4G LTE, etc.), Ultra-WideBand ("UWB"), WiMax, ZigBee, and/or other ad-hoc/mesh wireless network technologies, etc.

The user interface 150 may include a touch sensitive device 152 that may be configured as any suitable user interface or touch/contact surface assembly and a visual display 154 configured to display images. The visual display 154 may include a high definition display screen. The touch sensitive device 152 may be any touch screen, touch pad, touch sensitive structure, computer monitor, laptop display device, workbook display device, portable electronic device screen, or other suitable touch sensitive device. The touch sensitive device 152 may be configured for physical interaction with a user input element, such as a stylus or a part of the user's hand, such as a palm or digit (e.g., finger or thumb), etc. In some embodiments, the touch sensitive device 152 may include the visual display 154 and include at least one sensor superimposed thereon to receive inputs from the users input element.

The haptic output device 160 is configured to provide haptic feedback to the user of the system 100. The haptic feedback provided by the haptic output device 160 may be created with any of the methods of creating haptic effects, such as vibration, deformation, kinesthetic sensations, electrostatic or ultrasonic friction, etc. In an embodiment, the haptic output device 160 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electroactive polymers or shape memory alloys, a macro-composite fiber actuator, an electro-static actuator, an electro-tactile actuator, and/or another type of actuator that provides a physical feedback such as vibrotactile feedback. The haptic output device 160 may include non-mechanical or non-vibratory devices such as those that use electrostatic friction ("ESF"), ultrasonic friction ("USF"), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on. Multiple haptic output devices 160 may be used to generate different haptic effects, which may be used to create a wide range of effects such as deformations, vibrations, etc.

In an embodiment, multiple haptic output devices 160 may be positioned at different locations within the system 100 so that different information may be communicated to the user based on the particular location of the haptic output device 160. For example, as described in further detail below, in implementations in a vehicle, at least one of the haptic output devices 160 may be positioned away from the user interface 150 in the center console, such as at or in a steering wheel, a driver's seat and/or a driver's seatbelt, or any other surface the driver routinely comes into contact with while operating the vehicle, such that surfaces in constant contact with or touched by the driver may be moved or vibrated to provide the haptic feedback to the driver. In an embodiment, the haptic output device 160 may be located in a wearable device that is worn by the driver or any user of the system 100. The wearable device may be in the form of, for example, a smartwatch, wrist band, such as a fitness band, a bracelet, a ring, an anklet, smart clothing including smart socks or smart shoes, eyeglasses, a head-mounted display, etc. For non-vehicle implementations of the system 100, the user interface 150 may be part of a tablet or smartphone, for example.

Returning to FIG. 1, the sensor 170 may include one or more of the following types of sensors. In an embodiment, the sensor 170 may include a proximity sensor configured to sense the location of the user input element, such as the user's hand or a part of the user's hand, such as a finger, or a stylus, to an input device, such as the user interface 150. In an embodiment, the sensor 170 may include a camera and image processor and be configured to sense the location of the user input element relative to the user interface 150. In an embodiment, the sensor 170 may be located at or be part of the user interface 150. In an embodiment, the sensor 170 may be located in a wearable device being worn by the user, such as a smartwatch or wrist band. In an embodiment, the sensor 170 may be configured to sense the location of the electronic device(s) that include the haptic output device(s) 160 within the system 100. In an embodiment, the sensor 170 may be part of the user interface 150 and include a pressure sensor configured to measure the pressure applied to a touch location at the user interface 150, for example a touch location at the touch sensitive device 152 of the user interface 150. In an embodiment, the sensor 170 may include a temperature, humidity, and/or atmospheric pressure sensor configured to measure environmental conditions. In an embodiment, the sensor 170 may include a biometric sensor configured to capture a user's biometric measures, such as heart rate, etc. In an embodiment, the sensor 170 may include image sensors and/or a camera configured to capture a user's facial expressions and associated biometric information. In an embodiment, the sensor 170 may be used to identify the person who should receive the haptic feedback.

Figure 2:
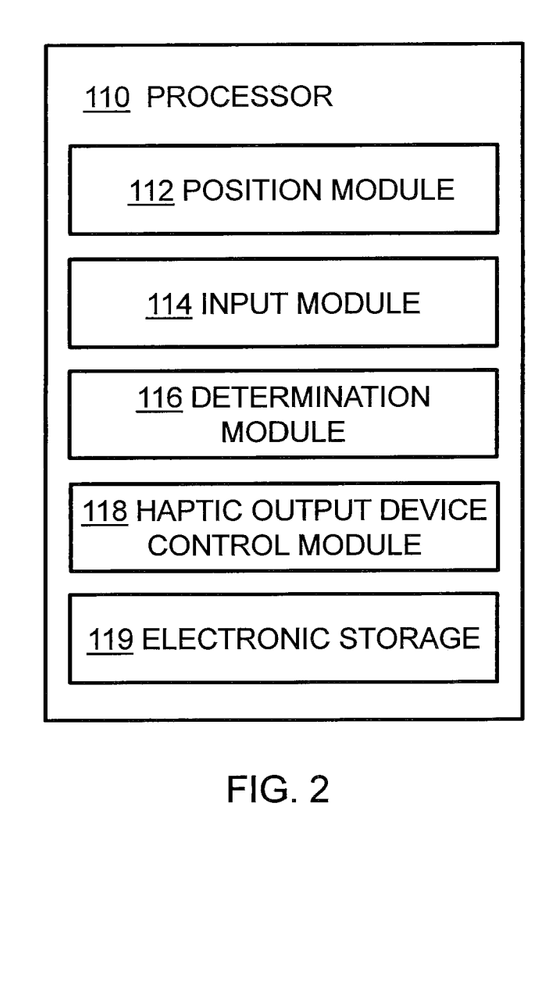
FIG. 2 is a schematic illustration of a processor of the system of FIG. 1.

FIG. 2 illustrates an embodiment of the processor 110 in more detail. The processor 110 may be configured to execute one or more computer program modules. The one or more computer program modules may include one or more of a position module 112, an input module 114, a determination module 116, a haptic output device control module 118, and/or other modules. The processor 110 may also include electronic storage 119, which may be the same as the memory device 120 or in addition to the memory device 120. The processor 110 may be configured to execute the modules 112, 114, 116 and/or 118 by software, hardware, firmware, some combination of software, hardware, and/or firmware, and/or other mechanisms for configuring processing capabilities on processor 110.

It should be appreciated that although modules 112, 114, 116 and 118 are illustrated in FIG. 2 as being co-located within a single processing unit, in embodiments in which the system includes multiple processors, one or more of modules 112, 114, 116 and/or 118 may be located remotely from the other modules. The description of the functionality provided by the different modules 112, 114, 116 and/or 118 described below is for illustrative purposes, and is not intended to be limiting, as any of the modules 112, 114, 116 and/or 118 may provide more or less functionality than is described. For example, one or more of the modules 112, 114, 116 and/or 118 may be eliminated, and some or all of its functionality may be provided by other ones of the modules 112, 114, 116 and/or 118. As another example, the processor 110 may be configured to execute one or more additional modules that may perform some or all of the functionality attributed below to one of the modules 112, 114, 116 and/or 118.

The position module 112 is configured or programmed to receive an input signal from the sensor 170 that is generated when the sensor 170 detects the user input element, such as the user's hand or a part of the user's hand, is in the vicinity of the user interface 150. The position module 112 is also configured or programmed to send a position signal to the determination module 116 for further processing.

The input module 114 is configured or programmed to receive an input signal from the user interface 150 that is generated when the user interface 150 detects an input from the user via the user input element. For example, the user may indicate an input by contacting a part of the user interface 150 that represents, for example, a button to trigger a function of the system 100 or apparatus in which the system 100 is a part of. For example, in implementations of the system 100 in a vehicle, the driver may press a button or a portion of the visual display 154 that displays a button, to indicate that the driver wants to turn on the air conditioning in the vehicle and set the target temperature for the vehicle. The input module 114 is configured or programmed to receive an input signal from the user interface 150, determine what further function the system 100 is to perform based on the input signal, and send a function signal to the determination module 116 for further processing.

The determination module 116 is configured or programmed to determine what type of action is to be taken by the system 100 according to the position signal from the position module 112 based on an output from the sensor 170 and the function signal from the input module 114 based on an output from the user interface 150, and what type of haptic feedback is to be generated by the haptic output device 160. The determination module 116 may be programmed with a library of position and function information available to the system 100 and corresponding haptic effect, if any, so that the determination module 116 may determine a corresponding output. In addition to sending a signal to command a particular action to be taken, such as turning on the air conditioner, the determination module 116 may also output a signal to the haptic output device control module 118 so that a suitable haptic effect may be provided to the user.

The haptic output device control module 118 is configured or programmed to determine a haptic control signal to output to the haptic output device 160, based on the signal generated by the determination module 116. Determining the haptic control signal may include determining one or more parameters that include an amplitude, frequency, duration, etc., of the haptic feedback that will be generated by the haptic output device 160 to provide the desired effect to the user, based on all inputs to the system 100.

Figure 3:
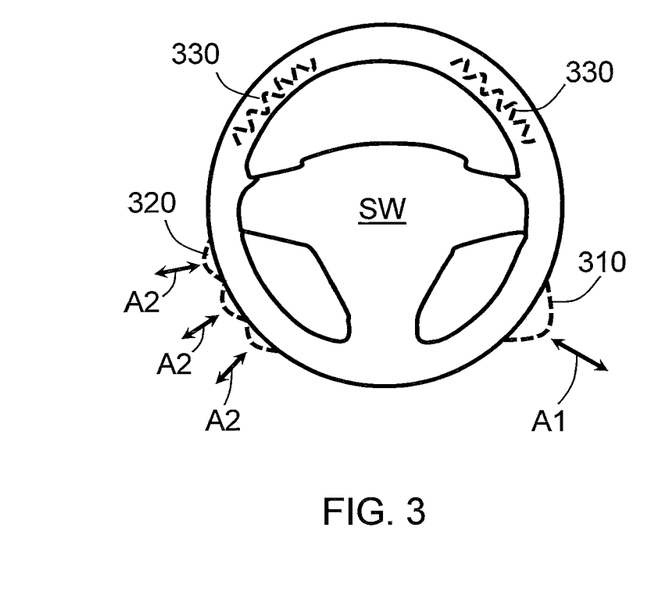
FIG. 3 is a schematic illustration of a portion of an implementation of the system of FIG. 1.

In implementations of embodiments of the invention in which the system 100 is provided in a vehicle, the vehicle may be equipped with a steering wheel SW illustrated in FIG. 3. As illustrated, the steering wheel SW may include a first haptic output device 310 that is configured to generate a single deformation point, as illustrated by arrow A1, and/or a second haptic output device(s) 320 configured to generate multiple deformation points with spatiotemporal patterns, as illustrated by arrows A2, and/or a third haptic output device 330 configured to generate changes in stiffness/softness/material properties of the contact point between driver's hand and the steering wheel SW. In an embodiment, different types of haptic effects may be provided to the driver of the vehicle to convey different information to the driver and any of the haptic output devices 310, 320, 330 may be configured to generate vibrations to the driver.

Figures 4, 5A, 5B:
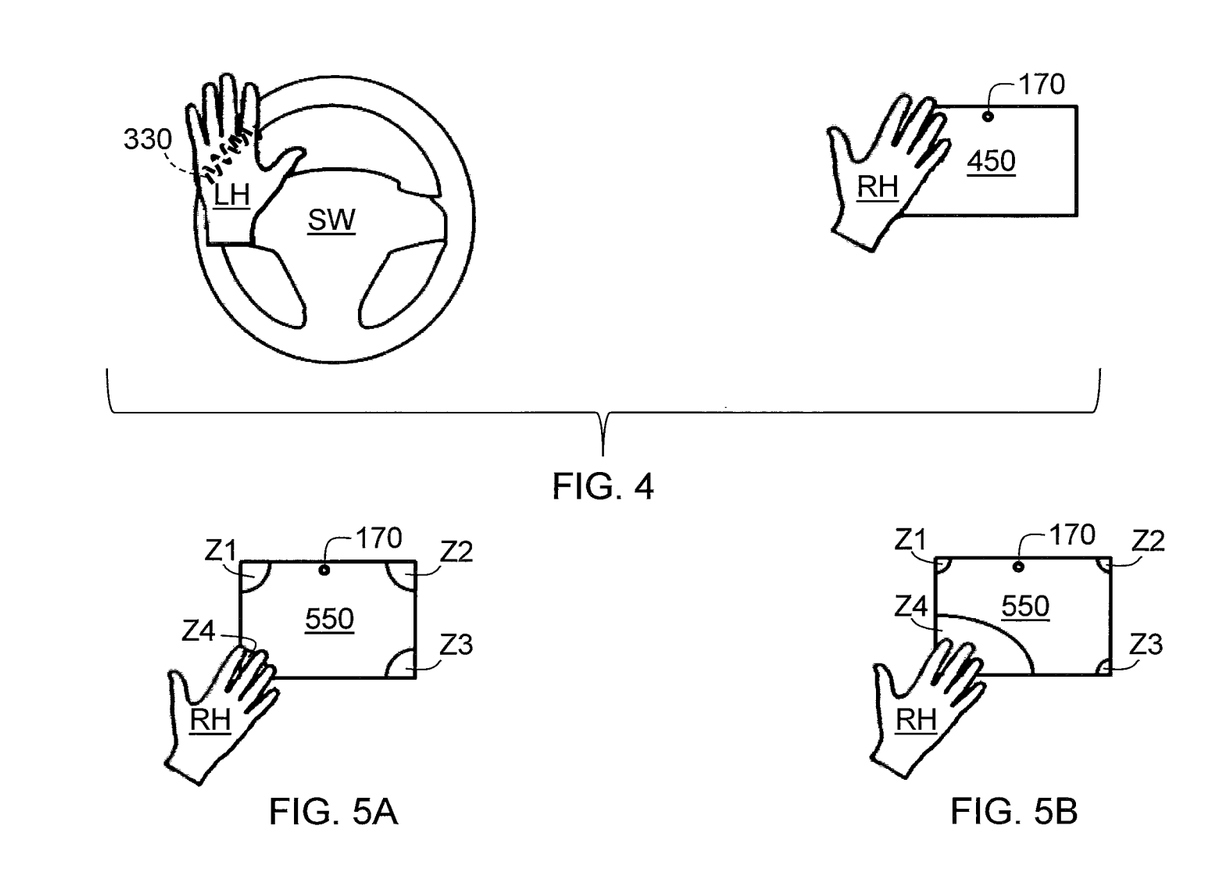
FIG. 4 is a schematic illustration of an implementation of the system of FIG. 1.
FIGS. 5A and 5B are a schematic illustrations of a portion of an implementation of the system of FIG. 1.

In an implementation of embodiments of the invention, a driver driving a vehicle in stormy conditions may not want to look away from the road, but may also want to change the temperature inside the vehicle. FIG. 4 illustrates the driver's right hand RH positioned near a user interface 450 located in the center console. When the sensor 170 described above senses that the driver's right hand RH is near or in proximity to the user interface 450, a haptic effect may be provided to the driver's left hand LH via the haptic output device 330 in the steering wheel SW. This allows the driver to keep his/her eyes on the road ahead, instead of the user interface 450. Different haptic effects may be generated by at least one haptic output device located in the steering wheel SW, depending on what part of the user interface 450 the driver's right hand RH is near or proximate to. The haptic effects generated by the haptic output device 330 in the steering wheel SW may be varied to help the driver locate the part of the user interface 450 that the driver needs to contact in order to provide an input to the system so that an adjustment to a subsystem of the vehicle, such as the air conditioner, may be made. By providing different haptic effects, the driver may more quickly determine when to press the user interface 450, and when the driver contacts the user interface 450 with the user input element, such as a finger, haptic effects may be played at the user interface 150 and the steering wheel SW, either at the same time or sequentially.

FIGS. 5A and 5B illustrate an embodiment of a user interface 550 having four zones indicated by Z1, Z2, Z3 and Z4, with each zone configured to control certain parameters of the subsystems of the vehicle. For example, Z1 may represent a first zone that is used to control the volume of the stereo system, Z2 may represent a second zone that is used to select a music track or radio station, Z3 may represent a third zone that is used to control a navigation system, and Z4 may represent a fourth zone that is used to control the internal temperature of the vehicle. If the driver would like to change the internal temperature of the vehicle, the driver may place his/her right hand RH on the user interface 550 or just above the user interface 550 at the fourth zone Z4, as illustrated in FIG. 5A. When the sensor 170 described above senses that the driver's hand is located at or proximate to the fourth zone Z4, the user interface 550 may expand the fourth zone Z4 and shrink the other zones Z1, Z2 and Z3 so that more options become available to the driver with respect to temperature control. A haptic effect may be provided to the driver with the haptic output device 330 located in the steering wheel SW, for example, as a verification that the fourth zone Z4 has been enlarged and the driver now has access to the temperature controls, such as turning the air conditioner on or off, or adjusting the temperature or the speed of a fan. The driver may then position his/her finger over the part of the enlarged fourth zone Z4 that corresponds to the action that needs to be taken. Haptic effects provided by the haptic output device 330 on the steering wheel SW may be generated in such a manner that guides the driver to the various locations in the enlarged fourth zone Z4 that correspond to the different functions so that the driver may make adjustments to the temperature without having to look at the user interface 550.

The sensor 170 described above may then detect the position of the driver's finger with respect to the user interface 550, or a gesture provided by the driver, and send a signal to the processor 110 described above to determine the action needed to be taken by the subsystem of the vehicle. In an embodiment, a second sensor (not shown) that is part of a touch sensitive device of the user interface 550 may be used to detect the input from the user when the user contacts the touch sensitive device of the user interface 550 with a user input element, such as the user's finger. Again, as a confirmation of the command made by the driver, a corresponding haptic effect may be generated away from the user interface 550 and at the steering wheel SW the driver is contacting. In an embodiment, a haptic output device in the user interface 550 or connected to the user interface 550 may be used to provide an initial confirmatory haptic effect as the driver is touching the user interface 550, and then provide another haptic effect with the haptic output device 330 in the steering wheel SW. In an embodiment, the haptic effect at the user interface may only be generated as long as the user input element is contacting the user interface 550.

Figure 6:
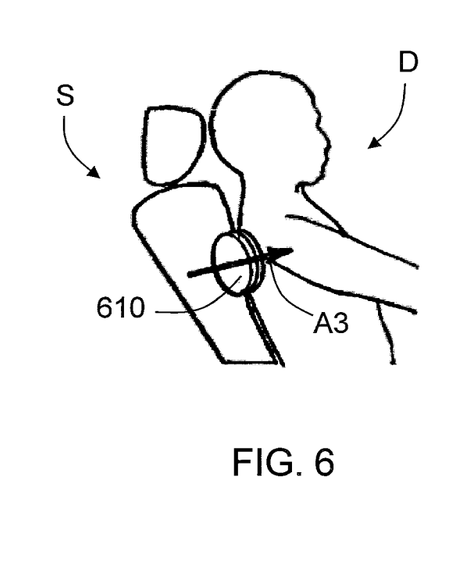
FIG. 6 is a schematic illustration of a portion of an implementation of the system of FIG. 1.

Similar to the haptically enabled steering wheel SW illustrated in FIG. 3, in an embodiment, a driver's seat S of the vehicle may include a haptic output device 610 located at a position that the driver D will always be in contact with, such as in the upright portion of the seat that supports the driver's back, as illustrated in FIG. 6. In the embodiment described above, haptic effects, such as vibrations or movement of the seat S towards the driver's back, as indicated by arrow A3, may be provided by the haptic output device 610 in the seat S instead of or in addition to the haptic effects provided by the steering wheel SW.

Figure 7:
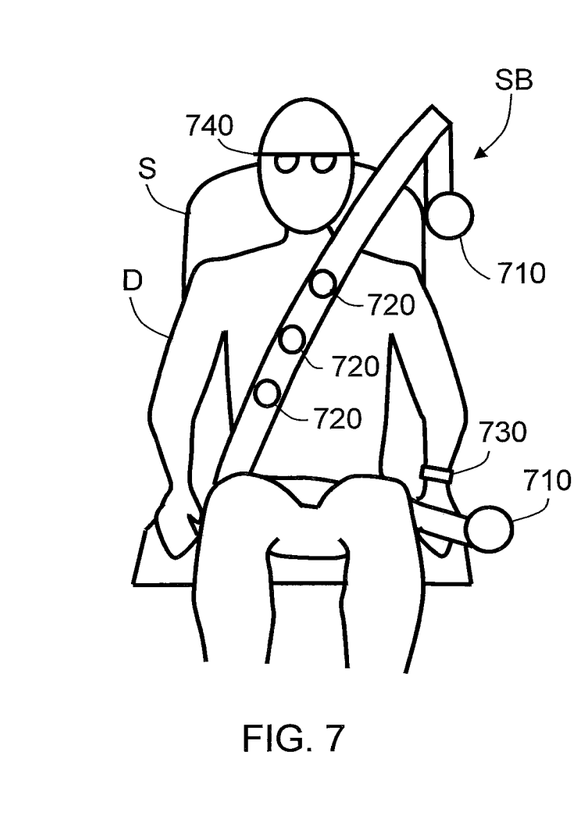
FIG. 7 is a schematic illustration of a portion of an implementation of the system of FIG. 1.

In an embodiment, one or more haptic output devices may be attached to or embedded in a seat belt SB and configured to generate kinesthetic and/or vibrotactile feedback to the driver D. As illustrated in FIG. 7, one or more haptic output devices 710 may be part of a pulling force control mechanism that already exists in many seat belts, and may be configured to convey kinesthetic feedback by adjusting the tension in the seat belt SB. Additional haptic output devices 720 that are configured to generate vibrotactile feedback may be embedded in or attached to the seat belt SB to provide vibrotactile feedback in addition to the kinesthetic feedback provided by the haptic output devices 710. Other parts of the vehicle that the driver is typically in constant contact with, such as a floor board and/or gas and brake pedals, may also include haptic output devices so that haptic effects can be provided to the driver's feet. The illustrated embodiments are not intended to be limiting in any way.

FIG. 7 also illustrates embodiments of wearable devices that may be used to provide haptic effects to the driver D. In an embodiment, the wearable device may be in the form of a wrist band 730, which may be a smartwatch or a fitness band. In an embodiment, the wearable device may be in the form of eyeglasses 740, which may be sunglasses or a head-mounted display such as GOOGLE GLASS® or BMW's Mini augmented reality goggles. In an embodiment, haptic effects may be provided to the driver via one or more of the wearable devices 730, 740 instead of or in addition to the other haptic output devices within the vehicle, such as the haptic output devices 310, 320, 330, 610, 710, 720 described above.

In an implementation of embodiments of the invention, the vehicle may include a user interface with a touch screen, but not include a haptically enabled steering wheel, seat, or seat belt. The driver of the vehicle in this implementation may be wearing a wearable device, such as a smartwatch, that includes at least one haptic output device and pairs with the user interface via a Bluetooth wireless connection, for example. The user interface may or may not include a haptic output device. Confirmations of inputs to the user interface may be provided by the wearable device to the driver of the vehicle. Similarly, in an embodiment, a smartphone that includes a haptic output device and is located in the driver's pocket may pair with the user interface and generate haptic effects based on interactions between the driver via the user input element and the user interface and/or signals output by the user interface.

In an embodiment a sensor within the vehicle may be used to sense the location of the smartphone that includes a haptic output device and the processor may determine the haptic effect to be generated to the user based in part on the sensed location of the smartphone. In an embodiment of the system that includes more than one electronic device with at least one haptic output device, a sensor within the vehicle may be used to sense the location of each device so that the processor may determine the ideal location to generate the haptic effect to the user. For example, if the driver is using the user interface to adjust the left mirror of the vehicle, the haptic effect may be generated by the electronic device that is closest to the left mirror of the vehicle, such as a smartphone in the driver's left pocket. If the driver is using the user interface to adjust the right mirror of the vehicle, the haptic effect may be generated by the electronic device that is closest to the right mirror, such as a smartwatch on the driver's right wrist. Similarly, if a haptic effect relating to motor performance is to be generated, the processor may determine to generate the haptic effect with the electronic device that includes a haptic output device that is closest to the driver's feet and vehicle's pedals, such as a haptically enabled anklet, etc.

Figure 8:
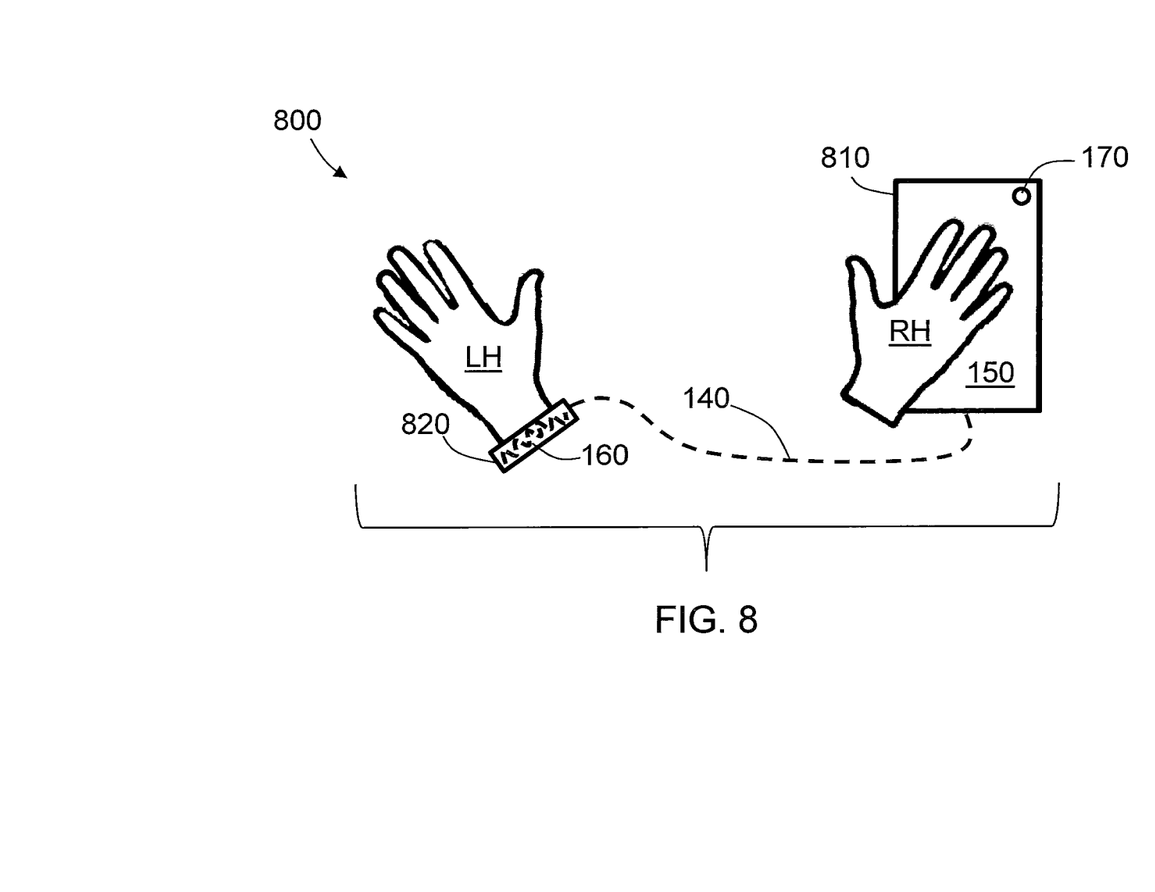
FIG. 8 is schematic illustrations of an implementation of the system of FIG. 1.

FIG. 8 illustrates an implementation of embodiments of the invention that may be used outside of the context of a vehicle. As illustrated, a system 800 includes a handheld electronic device 810, which may be, for example, a smartphone or a tablet, and a wearable device 820, which may be, for example, a smartwatch. The handheld electronic device 810 includes the user interface 150 and the sensor 170 described above, and the wearable device 820 includes the haptic output device 160 described above. The handheld electronic device 810 and the wearable device 820 communicate with each other via a wireless communications network 840. The user may interact with the handheld electronic device 810 using his/her right hand RH without having to look at a display of the handheld electronic device 810, and receive haptic effects via the haptic output device 160 on the wearable device 820 to confirm the interactions with the handheld electronic device 810.

Figure 9:
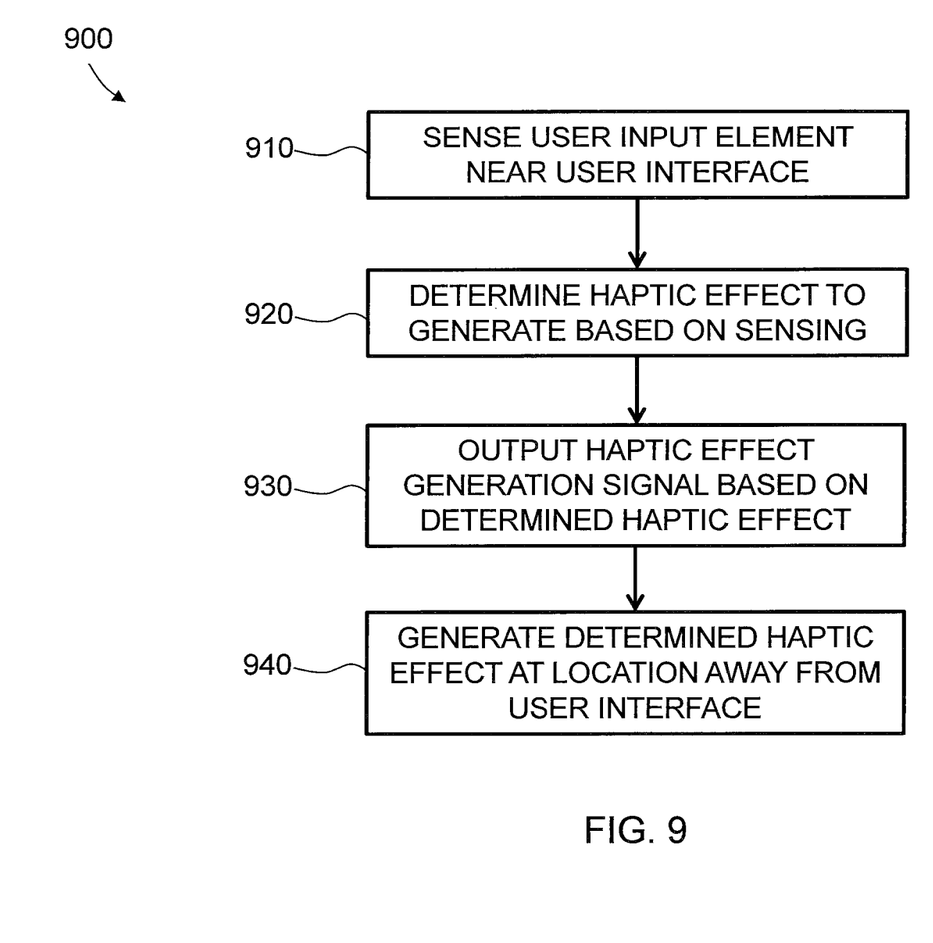
FIG. 9 is a flow chart that schematically illustrates a method according to embodiments of the invention.

FIG. 9 illustrates a flow chart of a method 900 for generating a haptic effect to a user of a system, such as the system 100 described above. At 910, a user input element, which may be part of a user's hand, such as a finger, or a stylus, is sensed near a user interface, such as the user interface 150 described above, with a sensor, such as the sensor 170 described above. At 920, a processor, such as the processor 110 described above, determines a haptic effect to generate based on the sensing of the user input element near or proximate to the user interface. At 930, a haptic effect generation signal based on the determined haptic effect is output by the processor to a haptic output device, such as the haptic output device 160 described above. At 940 the determined haptic effect is generated by the haptic output device at a location away from the user interface. The method may then return to 910, may end, or additional actions may be taken as part of the method.

For example, in an embodiment, an input by the user via the user input element contacting the user interface may be sensed by a sensor that is part of the user interface, such as a sensor that is part of a touch sensitive device, and a second haptic effect to generate to the user based on the input sensed may be determined with the processor. The second haptic effect may then be generated with a second haptic output device to the user at the user interface as a confirmation of the input by the user. In an embodiment, the second haptic effect may be generated as long as the user input element contacts the user interface. In an embodiment, a third haptic effect to generate to the user based on the input sensed may be determined with the processor, and the third haptic effect may be generated with the haptic output device to the user at the location away from the user interface. In an embodiment, the second haptic effect and the third haptic effect may be the same haptic effect or substantially the same haptic effect.

The embodiments described herein represent a number of possible implementations and examples and are not intended to necessarily limit the present disclosure to any specific embodiments. Various modifications can be made to these embodiments as would be understood by one of ordinary skill in the art. Any such modifications are intended to be included within the spirit and scope of the present disclosure and protected by the following claims.

What is claimed is:

1. A system for controlling functions in a vehicle, the system comprising:
   a user interface disposed in the vehicle and configured to receive an input at a zone of one or more zones of the user interface, wherein each zone of the one or more zones is configured to control parameters of at least one respective vehicle subsystem separate from and in communication with the user interface;
   a haptic output device disposed in the vehicle and located separate from the user interface; and
   a processor disposed in the vehicle and configured
      to determine that an input element is proximate to or located at a first zone of the one or more zones,
      to determine a haptic effect to spatially guide a user to move the input element in the first zone to a set of functions of a respective vehicle subsystem controlled by the first zone, wherein the haptic effect provides feedback directing the user from a current location of the input element to a location of the set of functions,
      to generate a haptic effect generation signal based on the haptic effect that is determined, and
      to communicate the haptic effect generation signal to the haptic output device,
   wherein the haptic output device is configured to receive the haptic effect generation signal from the processor and generate the haptic effect that is determined, the haptic effect being generated away from the user interface.

2. The system of claim 1, wherein the haptic output device is disposed in a steering wheel of the vehicle.

3. The system of claim 1, wherein the haptic output device is disposed in a seat, or a seatbelt of the vehicle.

4. The system of claim 1, wherein the one or more zones comprises a plurality of zones for controlling a plurality of respective vehicle subsystems.

5. The system of claim 4, wherein the vehicle subsystems include at least one of a stereo or radio subsystem, a navigation subsystem, and a temperature control sub system.

6. The system of claim 4, wherein the processor is configured, after determining that the input element is proximate to or located at the first zone of the plurality of zones, to cause the user interface to enlarge the first zone so as to display an enlarged first zone.

7. The system of claim 6, wherein the processor is configured, after determining that the input element is proximate to or located at the first zone of the plurality of zones, to cause the user interface to shrink other zones of the plurality of zones.

8. The system of claim 6, wherein the haptic effect is generated further in response to the user interface enlarging the first zone.

9. The system of claim 1, wherein the processor is configured to alter the haptic effect based on the movement of the input element to spatially guide the input element to the location of the set of functions.

10. The system of claim 9, wherein the feedback of the haptic effect comprises a physical effect indicating a direction to move the input element.

11. The system of claim 9, further comprising a proximity sensor disposed in the vehicle and configured to generate a signal identifying which zone of the one or more zones at which the input element is proximate to or located, wherein the processor is configured to determine the current position of the input element based on the signal, and wherein the input element is a finger.

12. A system comprising:
a user interface configured to receive an input at a zone of one or more zones of the user interface, wherein each zone of the one or more zones is configured to control a respective device that is separate from and in communication with the user interface;
a processor in communication with the user interface and configured
to determine that an input element is proximate to or located at a first zone of the one or more zones,
in response to determining that the input element is proximate to or located at the first zone, to cause the user interface to enlarge the first zone so as to display an enlarged first zone,
to determine a haptic effect to be generated to spatially guide a user to move the input element from a current location within the enlarged first zone to a desired location, wherein the haptic effect is based on a position of the input element within the enlarged first zone,
to generate a haptic effect generation signal based on the haptic effect that is determined, and
to communicate the haptic effect generation signal to a haptic output device, to cause the haptic effect to be generated at the haptic output device.

13. The system of claim 12, wherein the haptic output device to which the processor is configured to communicate is located separate from the user interface, such that the haptic effect is generated away from the user interface.

14. The system of claim 13, wherein the haptic output device to which the processor is configured to communicate is part of a phone or an electronic watch.

15. The system of claim 13, wherein the haptic output device is disposed at a steering wheel of a vehicle, a seat of the vehicle, or a seatbelt of the vehicle.

16. The system of claim 12, wherein the haptic effect is a second haptic effect, and the processor configured to generate a first haptic effect to indicate that a set of functions of a device controlled by the first zone is accessible due to the input element being proximate to or located at the first zone, wherein the first haptic effect is based on which zone the input element is proximate to or located at.

17. The system of claim 16, wherein the first haptic effect is generated further in response to the user interface enlarging the first zone.

18. A method performed by a processor for controlling a plurality of devices that are separate from and in communication with a user interface, wherein the plurality of devices are controlled by a plurality of respective zones of the user interface, the method comprising:
determining that an input element is proximate to or located at a first zone of the one or more zones;
determining a haptic effect to generate to spatially guide a user to move the input element in the first zone to a set of functions of a respective device controlled by the first zone, wherein the haptic effect provides feedback directing the user from a current location of the input element to a location of the set of functions,
generating a haptic effect generation signal based on the haptic effect that is determined, and
communicating the haptic effect generation signal to a wearable device that is located separate from the user interface, to cause a haptic output device of the wearable device to generate the haptic effect away from the user interface.

19. The method of claim 18, wherein the wearable device is an electronic watch.

20. The method of claim 18, wherein the haptic effect is generated away from the user input element.

* * * * *